July 14. 1925.
L. J. CAMPBELL
SPEED CHANGING MECHANISM
Filed May 9, 1921
1,545,580
4 Sheets-Sheet 3
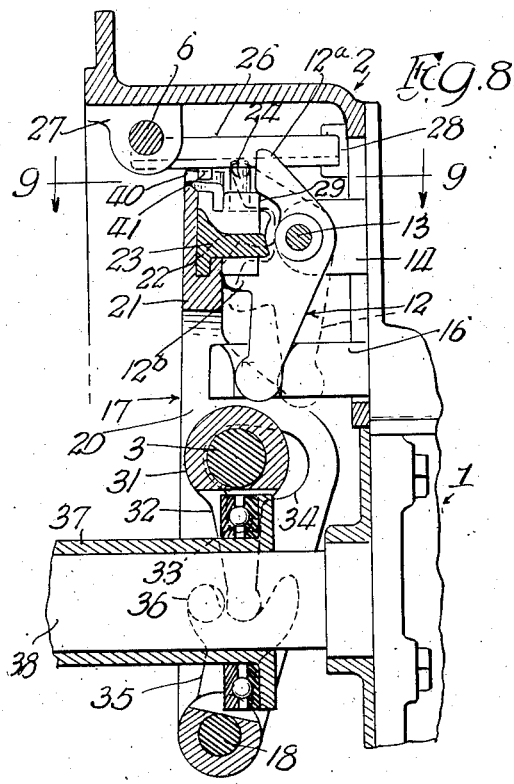
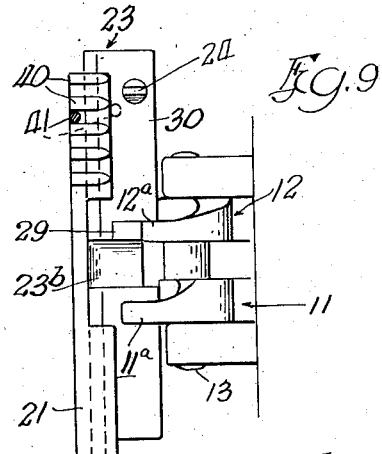
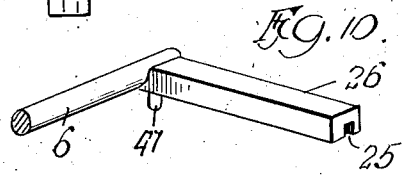
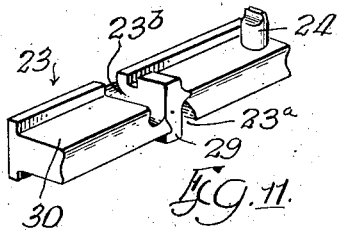
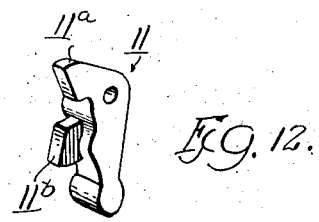
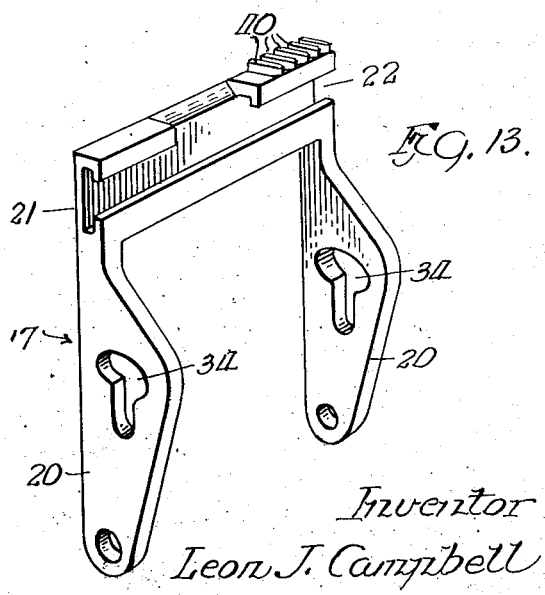
Inventor
Leon J. Campbell
by Eugene Cowan
Atty

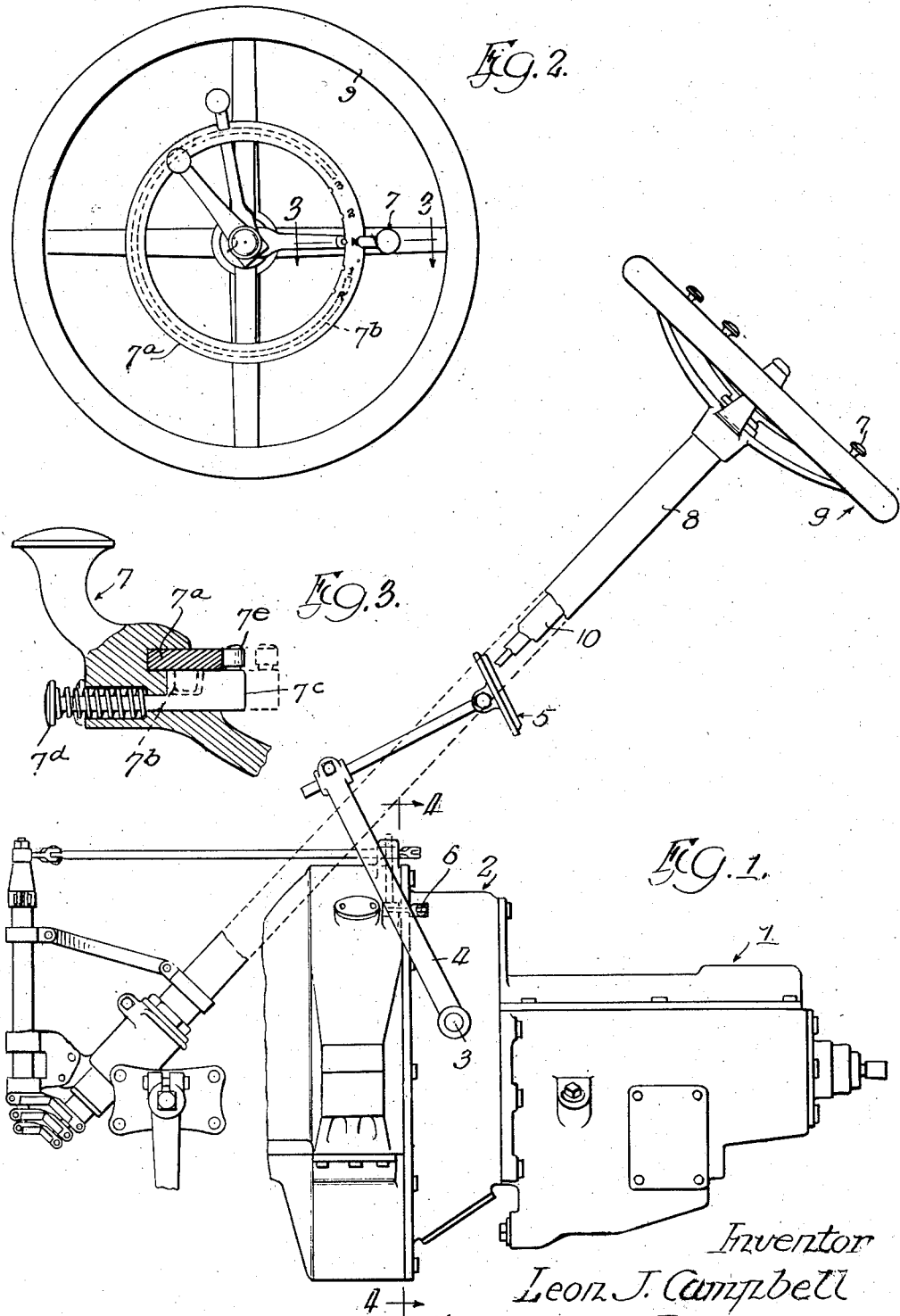

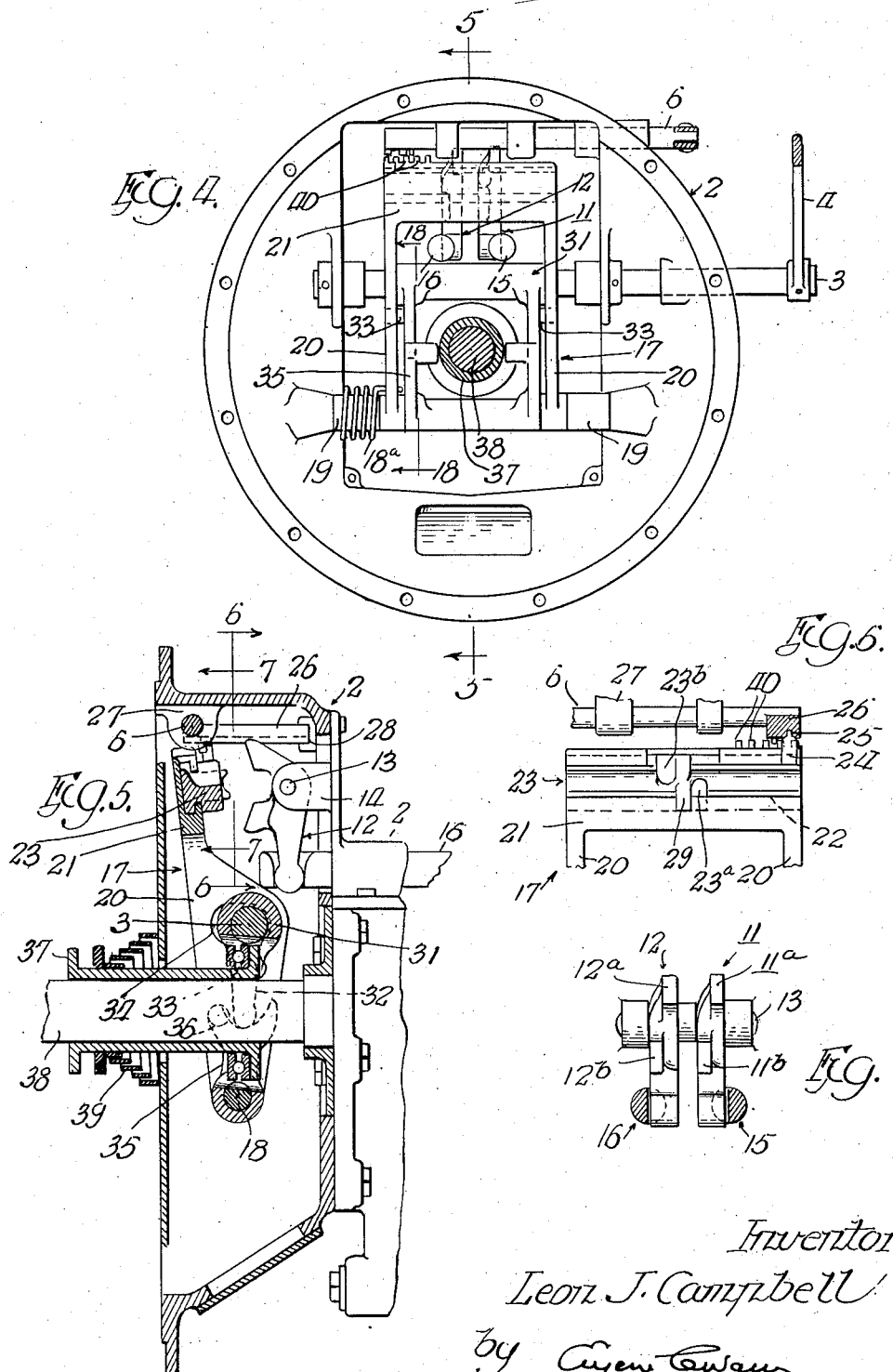

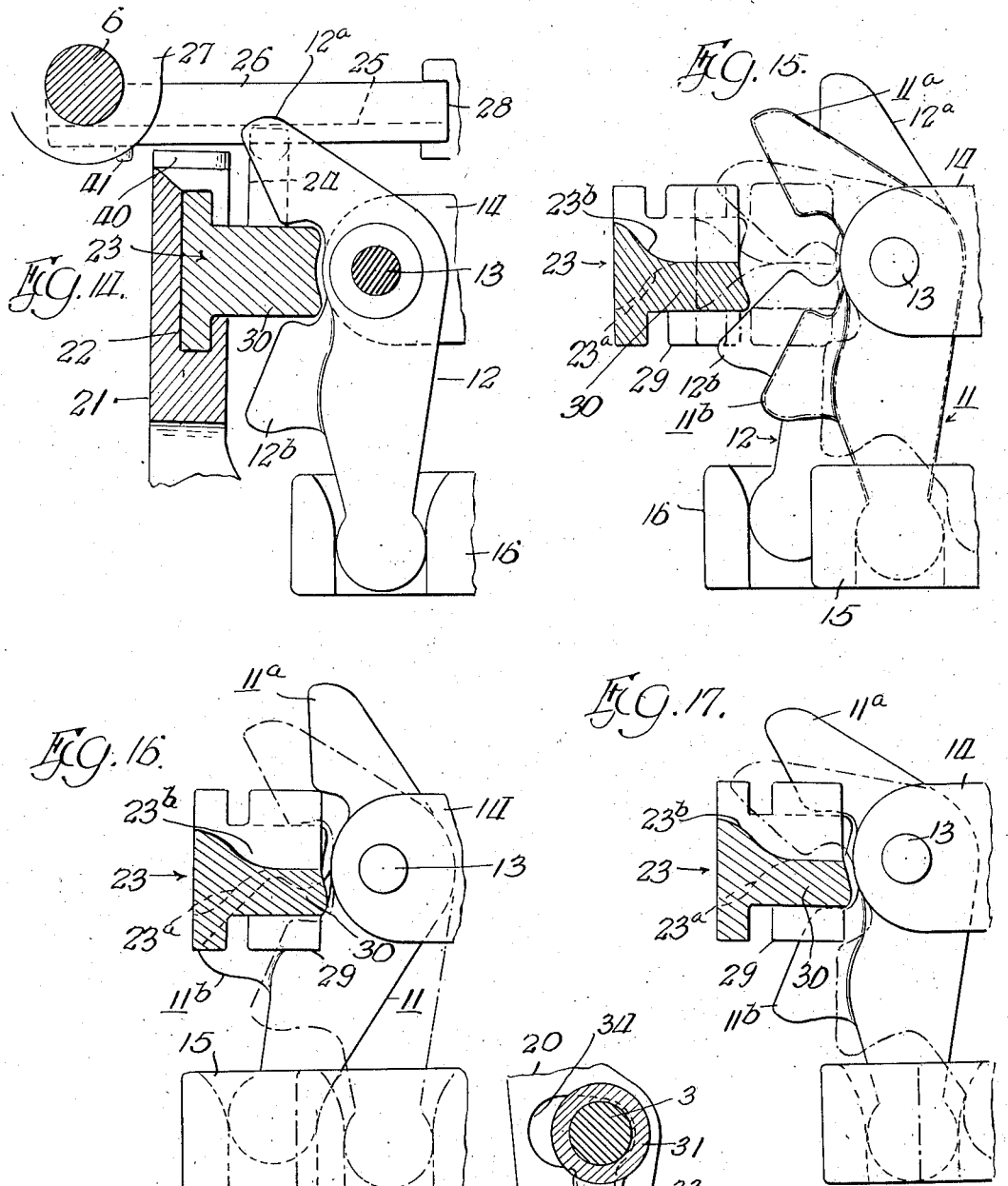

Patented July 14, 1925.

1,545,580

UNITED STATES PATENT OFFICE.

LEON JAY CAMPBELL, OF BUCHANAN, MICHIGAN, ASSIGNOR TO CAMPBELL TRANSMISSION COMPANY, OF BUCHANAN, MICHIGAN, A CORPORATION OF MICHIGAN.

SPEED-CHANGING MECHANISM.

Application filed May 9, 1921. Serial No. 467,841.

*To all whom it may concern:*

Be it known that I, LEON J. CAMPBELL, a citizen of the United States, residing at Buchanan, in the county of Berrien and State of Michigan, have invented new and useful Improvements in Speed-Changing Mechanisms, of which the following is a specification.

This invention relates to speed changing mechanisms for automobiles or other motor vehicles and more particularly to such mechanisms which are actuated by the clutch pedals to effect changes of speed, the speeds being selected in advance by the operation of selective devices from the steering wheel or other convenient location.

Among the objects of my invention is to improve the construction and operation of such mechanisms in the several particulars as will hereinafter more fully appear, and to provide in particular a speed changing mechanism especially adapted for use with an automobile transmission mechanism of the sliding key and all-in-mesh gear type, such as disclosed and claimed in my copending application Serial No. 322,837, filed September 10, 1919.

Another object of my invention is to provide a mechanism wherein a continued downward movement of the clutch pedal after releasing the clutch operates the speed changing mechanism to effect a change of speed in the transmission, the load of the clutch spring being dropped before operating said mechanism by the clutch pedal, so that there is no excessive pressure on the clutch pedal during the time that the speed change is taking place.

A further object of my invention is to render the mechanism positive and reliable in its action so that none other than the particular speed selected is gained upon actuating the mechanism through the clutch pedal, and furthermore afford no opportunity, while operating the clutch pedal, to gain such speed to shift all of the parts back into neutral position or into another position than required for gaining the selected speed.

A still further object of my invention is to lock through the speed changing mechanism, in neutral position and against accidental or other movement that shift rod of the transmission mechanism which is not being shifted to gain the selected speed.

Another object of the invention is to provide a lost motion connection between the clutch pedal and the speed changing mechanism, so that the clutch may be released through the actuation of the pedal as often as desired without operating the speed changing mechanism or effecting a change of speed thereby, even though the mechanism has been set to effect a change of speed when the pedal is actuated beyond clutch releasing position. Furthermore, this connection permits the mechanism to be set for any speed desired, either before or after the clutch has been released, and thus allow for a selection of a speed independently of the actuation of the clutch pedal and without throttling or stopping the motor.

The invention consists further in the matters hereinafter described and more particularly set forth in the appended claims.

In the accompanying drawings—

Fig. 1 is a side view of the steering post and wheel and change speed transmission mechanism of a motor vehicle equipped with a mechanically operated speed changing device of my invention;

Fig. 2 is a top plan view of the steering wheel showing the selector lever of my improved mechanism;

Fig. 3 is a fragmentary vertical sectional view taken on line 3—3 of Fig. 2;

Figs. 4 and 5 are vertical sectional views taken on lines 4—4 and 5—5 of Figs. 1 and 4, respectively;

Figs. 6 and 7 are vertical sectional views taken on the single section line of Fig. 5, the former figure being a section in one direction as indicated by the arrows 6, 6, and the latter figure being a section in the opposite direction as indicated by the arrows 7, 7;

Fig. 8 is a vertical sectional view similar to Fig. 5, but showing the mechanism in "first speed;"

Fig. 9 is a horizontal top plan view taken on line 9—9 of Fig. 8;

Figs. 10 to 13 inclusive are perspective views of details of construction to be hereinafter described;

Figs. 14 to 17 inclusive are detail views showing the shift levers in the different positions they occupy in the operation of my device; and Fig. 18 is a vertical sectional view taken on line 18—18 of Fig. 4.

In Fig. 1 of the accompanying drawings, 1 indicates an automobile transmission mechanism of the sliding key and all-in-mesh gear type as disclosed in my said co-pending application. To the front end of the casing of this mechanism is secured the bell housing 2 of the clutch casing, as in automobile construction. From one side of the casing 2 extends a shaft 3 horizontally arranged, in the instance shown, and secured to the end of this shaft exterior of the casing 2 is a lever 4 carrying at its upper end a foot pedal 5 within reach of the foot of the driver of the car, as in the usual automobile construction and by means of which the clutch is operated in the customary manner. The clutch pedal 5 is also connected with the mechanism of my invention so that a change of speed may be effected through the transmission mechanism 1 by the driver pushing down on the clutch pedal and releasing the clutch for that purpose.

To select the speeds desired, in advance of actually changing the speed by actuating the clutch pedal 5, I mount in the bell housing 2, above the shaft 3, a slide rod 6. This has connection with a selector located in the bell housing and to be hereinafter described. The rod 6 has one end extending outside of the housing 2 and is connected by the customary type of steering post connections with a hand lever 7 at the upper end of the steering post column 8 and operable at the steering wheel 9. This lever 7 is fixed to a tube 10 in the steering post 8, and the tube is connected at its lower end with the rod 6 through a bell crank lever and links as customarily used in connections of this kind and as indicated in Fig. 1.

Mounted within the housing 2 are vertically arranged levers 11 and 12. These are arranged side by side and are rockably mounted on a horizontal shaft 13 extending between and journaled in lugs 14 in the housing. For the levers 11, 12 there are an equal number of shift rods 15, 16, these being connected with the several sets of keys of the transmission mechanism 1 in the manner shown and described in my said co-pending application. In the accompanying drawings, there are two shift levers 15, 16, the former being connected with the lower end of the lever 11, and the latter with the lower end of the lever 12, as shown in Figs. 4 and 7.

Arranged in the housing 2 is a vertical frame 17 rockably mounted at its lower end on a horizontal shaft 18 extending between and journaled in lugs 19, as shown in Figs. 4 and 5. This frame is open and has vertical side members 20, 20 connected together at their upper ends by a cross-member 21, in the rear side of which is a horizontal groove or T-slot 22, as clearly shown in Figs. 5, 8, and 13. In this slot is a selector block 23, which has at one end an upright pin 24 extending into a groove 25 in the under side of a bar 26 secured to one end of the rod 6, as clearly shown in Figs. 6 and 10. The rod 6 is at right-angles to the bar 26, or substantially so, and is slidably retained in a journal box 27 in the housing 2, as shown in Figs. 5 and 8. The bar 26 has its opposite end in a groove 28 in the adjacent face of the bell housing 2, as shown in said figures.

As shown in Fig. 11, the selector block 23 is provided intermediate its ends with a vertical lug 29, projecting above and below the horizontal body portion 30 of the selector. The levers 11, 12 are provided above and below the shaft 13 with outwardly projecting lugs 11$^a$, 11$^b$ and 12$^a$, 12$^b$, respectively. The lugs on each lever are not in the same vertical plane, but are in vertical planes offset laterally from each other for the purposes to be presently described.

For rocking the frame 17 toward and from the levers 11 and 12, I employ the horizontal shaft 3. On this shaft, between the side arms 20 of the frame 17, is clamped a yoke 31 having depending arms 32, these being provided with outwardly projecting pins 33 at the sides thereof and working in elongated openings 34, in the side arms 20 of the frame, as shown in the drawings. The lower ends of the arms 32 work against fork-shaped arms 35, fixed on the shaft 18 and projecting above the same within the frame 17. These arms 35 are provided with inwardly extended pins 36 adjacent their upper ends and which engage in an annular groove in a sleeve 37 slidably mounted on the clutch shaft 38 extending into the bell housing 2 and through the frame 17, as shown.

The mechanism shown operates as follows: When the keys of the transmission mechanism in the casing 1 are in neutral, the parts of my present device occupy the positions shown in Fig. 5, and when in such positions the frame 17 stands swung out from the levers 11, 12, and both of said levers are in the same vertical position, as shown. The inner ends of the slots 34 are in contact with the shaft 3 and prevent the frame 17 from being swung farther away from the levers 11, 12. At this time, the selector block 23 is in neutral position with its lug 29 between the levers 11, 12 and out of the path of any of the lugs of said levers, so that should the frame 17 be swung toward said levers, the lug 29 will not operate against the same to move them out of their neutral positions. To receive the lower lug 12$^b$ of the lever 12 when the frame is swung in toward the levers at this time, the selector 23 is provided with a bottom recess 23$^a$, and the upper edge of the body portion 30 clears the lower ends of the upper lugs of said levers. The height of the body portion 30 is such that it clears the lower lug 11$^b$ of the lever 11 when the lever is rocked toward the levers at this time.

To set the mechanism to throw into low or "first" speed, the hand lever 7 on the steering wheel is moved from the neutral position shown in Fig. 2, into position opposite the numeral "1" marked on the annular indicator ring 7$^a$ carried on the steering wheel. This slides the selector block 23 toward the left, when the parts are viewed as shown in Fig. 4 and carries the lug 29 in position to contact with the upper lug 12$^a$ of the lever 12 when the frame 17 is swung toward said levers. When that is done, the lever 12 is rocked upward by the upper end of the lug 29 operating on the front face of the upper lug 12$^a$. The front faces of the upper and lower lugs of the levers are inclined, and when in neutral, as shown in Fig. 5, they converge inwardly. Thus when the lug 29 contacts with the upper lug 12$^a$, as described, the lever 12 is rocked upward to draw the shift rod 16 outward to move the keys connected with said rod and gain first or low speed in the transmission mechanism in the box 1. When the lug 29 has reached the limit of its inward swinging movement, it rides under the lower end of the lug 12$^a$ and holds the lever 12 locked in the position into which it has been swung, as shown in full lines in Fig. 8. The bottom recess 23$^a$ in the selector 23 is wide enough to allow the selector to be moved to the extent described without carrying said recess out of the path of the lower lug 12$^b$, thus permitting said lug to enter said recess when the lever 12 is rocked upward and not hindering that movement. The body part 30 of the selector at this time moves freely into the space between the upper and lower lugs 11$^a$, 11$^b$ of the lever 11 without rocking said lug, and in addition holding said lever from being rocked accidentally or otherwise while the other lever is moved to gain "first" speed, as shown in Fig. 8. The frame 17 is rocked by the driver of the car pushing down on the clutch pedal 5. Normally the spring 39 (Fig. 5) holds the clutch in engagement with its cooperating part so that power may be transmitted from the engine to the rear wheels of the car through the transmission in the box 1. When the foot pedal 5 is depressed, it first releases the clutch before rocking the frame 17. After the clutch has been thrown out or released, a continued downward movement on the foot pedal 5 will rock the frame 17 and operate the lever 12 to secure first speed. On releasing the foot pedal 5 after the speed has been secured, the spring 39 returns the clutch into "engagement" and also returns the frame 17 to its normal position, as shown in Fig. 5, the selector 23 and other parts remaining in the positions just described.

To obtain the next or second speed, the hand lever 7 is moved over the indicator ring 7$^a$ until opposite the numeral "2", designating second speed and in so doing the selector 23 is moved toward the right, when the parts are viewed as in Fig. 4, from the position described for "first" speed into position for second speed. This shifts the lug 29 into position opposite the lower lug 11$^b$ of the lever 11 and brings the left-hand portion of the body part 30 in the path of the lower lug 12$^b$ of the lever 12 (Fig. 15), and as said lug 12$^b$ is projected above the lug 11$^b$, the selector part 30 will contact with the lug 12$^b$ in advance of the lug 29 engaging the lower lug 11$^b$ so as to throw the lever 12 back to neutral position before rocking the lever 11 downward to secure second speed. After the lug 12 has been rocked into neutral position (full lines Fig. 14 and dot-and-dash lines Fig. 15), the lower end of the lug 29 contacts with the lower lug 11$^b$ and rocks the lever 11 downward, the upper end of the lever 11 rocking down into the upper recess 23$^b$ of the selector, as shown in dotted lines in Fig. 17. The body portion 30 of the selector being between the upper and lower lugs of the lever 12, as shown in Fig. 14, holds said lever from movement, accidentally or otherwise, in either direction during the shifting of the lever 11. The frame 17 is moved to secure this speed by operating the clutch pedal 5, as before.

To move into third or "high" speed, the hand lever 7 is moved over the indicator ring 7$^a$ into position opposite the numeral 3 marked on said ring, and in so doing the selector 23 is moved its full distance toward the right when the parts are viewed as in Fig. 4. This shifts or moves the lug 29 out of the path of the lower lug 11$^b$ and into the path of the upper lug 11$^a$ of said lever 11, which lug 11$^a$ at such time is projecting downward and in position to have its inclined front face to be engaged by the upper end of lug 29. As the frame 17 is swung inward, said lug 29 rocks the lever 11 upward and comes to rest under the lower end of said lug to hold it from downward movement, as heretofore described in connection with the lever 12. The lower slot 23$^a$ has at this time been shifted to receive the lower lug 11$^b$ and allows the lever 11 to be swung upward as described. This causes a movement of the shift rod 15 to secure third or high speed, and the frame 17 is rocked inward for this purpose by operating the foot pedal 5 in the releasing of the clutch as before.

To gain reverse speed, the hand lever 7 is moved over the ring 7ª until opposite the letter "R" marked on said ring, and in so doing the selector 23 is shifted endwise from its extreme right-hand position to its extreme left-hand position. This shifts the lug 29 in path of the lower lug 12ᵇ of the lever 12 and the upper slot 23ᵇ in path of the upper end of the lever 12. The part 30 of the selector on the right of the lug 29 is at this time in position to contact with the now raised lower lug 11ᵇ of the lever 11, so that when the frame 17 is swung in contact with the levers the part 30 will first engage the lower lug 11ᵇ and rock the lever 11 into neutral position before the lower end of the lug 29 contacts with the lower lug 12ᵇ. After the lever 11 has been rocked into neutral position, the continued swinging of the frame 17 inward causes the lug 29 to operate against the lower lug 12ᵇ and swings the lever 12 downward to actuate the shift rod 16 and set the transmission into reverse speed.

To go from reverse to neutral the hand lever 7 is moved back to the position indicated by letter "N" on the ring 7ª, and this shifts the lug 29 into the position previously described for neutral. The lever 11 is already in neutral and the part 30 of the selector 23 at the left of the lug 29 is in position to operate against the upper lug 11ª and rock the lever 11 upward into neutral position.

With the mechanism described any speed may be selected before the particular speed is to be used. For instance, while the car is traveling over a roadway at high or in third speed, the speed changing mechanism may be set in a slower speed so that that speed may be had the instant the occasion demands and thus avoid wasting any time in shifting into that speed when it is needed. This may be necessary when ascending a grade or in a sand stretch or other place where a slower speed is required. Thus, before reaching the grade or sand stretch, the operator can select the particular speed desired by turning the hand lever 7 on the steering wheel opposite the indicated mark for the speed desired and that will shift the selector 23 into position on the frame 17 to immediately establish the speed selected when the operator actuates the foot pedal 5 to throw in the speed. Likewise, when the car is running in first or slow speed, the operator may, in advance of the time when a higher speed is required, set the mechanism into that speed or even into reverse. The arrangement and shape of the slots 34 are such that the frame 17 is not swung into engagement with the levers 11 and 12 until after the clutch has been released so that the clutch may be released whenever the occasion demands without swinging the frame 17 and thus avoid changing speeds when that is not required.

The pin 24 being in the slot 25 permits the frame 17 to be rocked into and out of contact with the levers 11, 12, yet connects the selector 23 with the slide rod 6.

The cross bar 20 of the frame 17 is provided at one end with a plurality of upwardly projecting parallel teeth or ribs 40 extending across the member 21, as shown in Fig. 13. These ribs or teeth form between them a plurality of slots to receive a depending pin 41 on the bar 26 and offset from one side of the pin 24, as shown in Fig. 10. The inner ends of these ribs 40 are beveled or inclined, as shown in Fig. 9, so that should the selector 23 be shifted a little to one side or the other of the position selected, the pin 41, while being slightly out of the path of the particular groove into which it is to be moved, will when engaged by the rib 40 be drawn into the particular groove, and enable none other than the selected speed being gained. The purpose of this construction is to line up and disregard the lost play in the selecting means.

In order to allow the clutch pedal to be pressed downward beyond the stroke of the clutch, after being released, to drop the load of the clutch spring and place no excessive pressure on the clutch pedal while changing a speed in the transmission, I make the upper ends of the arms 35 forked to receive the lower ends of the arms 32, which when in normal position are as shown in Figs. 5 and 18. As illustrated, the lower end of each arm 32 is designed to engage the rear side 42 of the fork, so that when the clutch pedal is pushed downward, it will, in releasing the clutch, swing the arms 35 backward, and, by the lost motion connection provided between the arms 32 and frame 17 through the slots 34 and pins 33, permit the clutch to be released in advance of moving the frame 17. As this movement is continued, the frame 17 is rocked after the clutch has been released, the edges 42 being angled off so that the greater load of the clutch is dropped before a speed is selected, and allows the clutch pedal to be pushed downward beyond clutch releasing position to actuate the frame 17 and change the speed selected. Thus, all the power applied on the clutch pedal is used to change the speed, with the result that the speed change is made manually. This allows a speed change to be made over any hindrance likely to occur by the lubricant in the gear box becoming hard and stiff.

The ring 7ª, as shown in Fig. 2, is provided on its under side with a depending, circular flange 7ᵇ, cut away between stations "1" to "3" so that the lever 7 may be freely moved back and forth between those stations without hindrance by said flange 7ᵇ. The lever 7 carries a spring pressed member 7ᶜ normally lying in the path of the flange 7ᵇ, as shown in Fig. 3. The member 7ᶜ has a thumb piece or head 7ᵈ at its outer end, by means of which the member may be pushed inward to carry the same out of the path of the flange 7ᵈ and thus permit the lever 7 to be moved in "reverse" position. This member carries a roller 7ᵉ to bear against the inner edge of the ring for guiding purposes and to engage in shallow notches for holding the lever against accidental movement. Normally the member 7ᶜ stands in the path of the flange 7ᵇ to prevent the lever from being moved accidentally into "reverse." As shown in Fig. 4, there is a coiled spring 18ᵃ on one of the lugs 19 and engaging the frame 17. This acts to hold the frame from rattling by the vibrations to which the automobile is subjected while traveling over a roadway.

The changing speed mechanism as described and an automobile transmission mechanism of the sliding key and all-in-mesh type as disclosed in my said co-pending application, is simple in construction when compared with gear shifters heretofore designed and used. It is positive and reliable because it insures the selection of none other than the speed desired and holds one of the levers in neutral position and against accidental or other movements while being shifted to gain change of speed. The gears of the transmission being constantly in mesh and the sliding key type of engagement speed changing can be done without synchronizing of the gears or throttling of the motor before the speed changes can be made. Thus, the change of speed is quick and immediate and at the instant the occasion demands regardless of road conditions.

The lugs of the levers 11 and 12 being above and below the pivotal point 13, and having inclined contact faces, as shown, permit the selector 23 to have a substantially straight line movement into and out of contact with the lugs. This reduces to the minimum the amount of throw or swing required for the frame 17 and thus enables the mechanism to be accommodated readily and easily by the usual bell housing 2 without increasing the dimensions of that part.

The selector bar 23 is made in one piece and performs three duties. It neutralizes the levers, selects the speed desired, and also acts as a lock for the levers for preventing two speeds from being engaged at the same time. This brings all of the parts for the several duties into one part, thus reducing the cost of the construction and simplifying it. Other and further objects of my invention will be apparent to those skilled in the art to which my invention relates.

While I have shown and described herein in detail a speed changing mechanism, it is to be of course understood that the details of construction and arrangement of parts illustrated may be variously changed and modified without departing from the spirit and scope of my invention.

I claim as my invention:

1. A speed changing mechanism, comprising shift levers arranged side by side and pivoted intermediate their ends, a rockably mounted member, a selector slidably carried by said member and movable therewith into and out of contact with said levers in the arc of a circle passing through the pivotal points of said levers for moving the same in either direction, means for adjusting said selector for any of said levers, and means for swinging said member.

2. A speed changing mechanism, comprising shift levers arranged side by side and pivoted intermediate their ends, a rockably mounted member, a selector slidably carried by said member and movable therewith into and out of contact with said levers in the arc of a circle passing through the pivotal points of said levers for moving the same in either direction, means for adjusting said selector to engage any of said levers on either side of their pivotal points, and means for swinging said member.

3. A speed changing mechanism, comprising shift levers arranged side by side and pivoted intermediate their ends, said levers having lugs on opposite sides of their pivotal points and spaced apart laterally, a rockably mounted member, a selector slidably carried by said member and movable therewith into and out of contact with said lugs for moving the levers in either direction, means for adjusting said selector for any of the lever lugs, and means for swinging said member.

4. A speed changing mechanism, comprising shift levers arranged side by side and pivoted intermediate their ends, a rockably mounted member, a selector slidably carried by said member and movable therewith into and out of contact with said levers for moving the same in either direction, means on the selector for holding one lever against movement while another lever is being moved, means for adjusting said selector for any of said levers, and means for swinging said member.

5. A speed changing mechanism, comprising shift levers arranged side by side and pivoted intermediate their ends, said levers having lugs on opposite sides of their pivotal points and spaced apart laterally, a rockably mounted member, a selector slidably carried by said member and movable therewith into and out of contact with said lugs for moving the levers in either direction, means on the selector to enter between the lugs of the levers for holding one lever against movement while any other is being moved, means for adjusting said selector for any of the lever lugs, and means for swinging said member.

6. A speed changing mechanism, comprising shift levers arranged side by side and pivoted intermediate their ends, said levers having lugs on opposite sides of their pivotal points and spaced apart laterally, said lugs having inclined faces converging inward toward the pivotal points of the levers, a rockably mounted member, a selector slidably carried by said member and movable therewith toward and from said levers, said selector having a lug to engage the inclined faces of the lever lugs for moving said levers in either direction, means for adjusting said selector for any of said lever lugs, and means for swinging said member.

7. A speed changing mechanism, comprising shift levers arranged side by side and pivoted intermediate their ends, said levers having lugs on opposite sides of their pivotal points and spaced apart laterally, said lugs having inclined faces converging toward the pivotal points of the levers, a rockably mounted member, a selector slidably carried by said member and movable therewith toward and from said levers, said selector having a lug to engage the inclined faces of the lever lugs for moving the levers in either direction, said selector lug being carried beyond the inner ends of said inclined faces, means for adjusting said selector for any of the lever lugs, and means for swinging said member.

8. A speed changing mechanism, comprising shift levers arranged side by side and pivoted intermediate their ends, said levers having lugs on opposite sides of their pivotal points and spaced apart laterally, a rockably mounted member, a selector slidably carried by said member and movable therewith toward and from said levers, said selector having a lug to engage the lever lugs for moving the levers in either direction, means for adjusting said selector for any of the lever lugs, and means for swinging said member, said selector having recesses on opposite sides of its lug to receive the lever lugs.

9. A speed changing mechanism, comprising shift levers arranged side by side and pivoted intermediate their ends, a rockably mounted member, a selector slidably carried by said member and movable into and out of contact with said levers for moving the same in either direction, means on the selector for engaging one lever in advance of another for moving the former into and holding it in neutral position before the selector actuates the other lever, means for adjusting said selector for any of said levers, and means for swinging said member.

10. A speed changing mechanism, comprising shift levers arranged side by side and pivoted intermediate their ends, a rockably mounted member, a selector slidably carried by said member and movable into and out of contact with said levers for moving the same in either direction, means for adjusting said selector for any of said levers, means for automatically aligning the selector, in the movement of the latter toward the levers, into proper position to act on the lever for which the selector is set in advance of contact of the selector with said lever, and means for actuating said member.

11. A speed changing mechanism, comprising shift levers arranged side by side and pivoted intermediate their ends, a rockably mounted member, a selector slidably carried by said member and movable therewith into and out of contact with said levers for moving the same in either direction, means for adjusting the selector for any of said levers, means for swinging said member, and means for automatically adjusting the selector on the member comprising ribs with beveled ends on one part and a pin fixed on the other part.

12. A speed changing mechanism, comprising shift levers, a rockably mounted frame, a selector slidably carried by said frame and movable therewith into and out of contact with said levers for moving the same in either direction, means for adjusting said selector for any of said levers, a shaft extending through slots in the sides of said frame, a yoke between the sides of said frame and fixed on said shaft, arms on said yoke, pins on said arms and extending into said slots, for rocking said frame by said shaft, and means for actuating said shaft.

13. A speed changing mechanism, comprising shift levers pivoted intermediate their ends, a rockably mounted member, a selector slidably carried by said member and movable therewith into and out of contact with said levers for moving the same in either direction, means for adjusting said selector for any of said levers, a clutch pedal for swinging said member, and means providing a lost motion connection between said member and said pedal for enabling the clutch pedal to release the clutch in advance of swinging said member.

14. A speed changing mechanism, comprising speed changing elements, a selector for actuating said elements in either direction, means for adjusting said selector for any of said elements, a shaft, a yoke fixed thereon and having arms, rock arms extending toward said yoke arms, said rock arms having curved faces engaged by said yoke arms to permit slippage of the latter on said rock arms after the latter have been moved by said yoke arms a distance to release the clutch for enabling the yoke arms to move the selector into engagement with said elements, and a clutch pedal connected with said shaft for actuating the same.

15. A speed changing mechanism, comprising speed changing elements, a one piece selector movable into and out of contact with said elements for moving the same in either direction, a member for carrying said selector into and out of operative engagement with said elements, said selector carrying means for neutralizing one element in advance of the movement of another element and for holding the neutralized element in neutral position while moving the other element, all in the movement of said selector toward said elements, means for moving said member toward and from said elements for carrying the selector into and out of contact therewith, and independent means for adjusting said selector on said member for any of said elements.

In testimony that I claim the foregoing as my invention, I affix my signature this 6 day of May, A. D. 1921.

LEON JAY CAMPBELL.